Patented July 12, 1927.

1,635,302

UNITED STATES PATENT OFFICE.

JULIUS ALSBERG, OF NEW YORK, N. Y., ASSIGNOR TO B. HELLER & COMPANY, OF CHICAGO, ILLINOIS, A CORPORATION OF ILLINOIS.

SAUSAGE MEAT AND METHOD OF PRODUCING SAME.

No Drawing.   Application filed June 12, 1925. Serial No. 36,751.

My invention relates to improvements in the art of curing or preparing meat and the same has for its object more particularly to provide a meat product and a simple efficient and economical method of making or preparing meat for sausages and the like.

Further, said invention has for its object to provide a method of making or preparing sausage meats by which the time required to effect the cure will be materially decreased, and at the same time a milder product of superior quality, color and taste obtained.

Further, said invention has for its object to provide a method by which the product will be more uniformly cured and with a smaller amount of curing medium, than is possible with the methods now in use.

Further, said invention has for its object to provide a method by which a product will be obtained possessing better binding qualities than are obtainable by the present methods.

Other objects will in part be obvious and in part be hereinafter described.

To the attainment of the aforesaid objects and ends my invention consists in the product and in the novel method comprising the successive steps hereinafter more fully described and then pointed out in the claims.

In carrying out my method of treating or preparing meat for use in the manufacture of sausages I first take the meat and cut or reduce the same by hand or by any suitable mechanism to pieces of about one inch to one and one half inches in size or diameter, and to every hundred pounds of meat I add a suitable curing medium, consisting, preferably, of common salt, 2 lbs.; sodium nitrate, 1½ oz.; sodium nitrite, $\tfrac{3}{10}$ oz.

While this curing medium will act without the addition of sodium nitrate, I prefer to include the same as it serves to cause the curing medium to produce a better and milder cure.

To said curing mixture there may be added at this time, or at a later stage of the curing operation, as desired, sugar and spices to suit the taste.

The meat is then permitted to cure for a period ranging from two to five days, depending upon the nature and the size of the pieces of meat.

The meat and curing mixture are thoroughly mixed, and then run through a grinder in order further to reduce or chop the meat and to thoroughly mix the meat and curing medium.

Additional salt to improve the taste may be added to the ground meat at this time.

The meat is then packed in a suitable tierce or receptacle having first placed upon the bottom thereof a layer of the curing mixture above described, and the tierce or receptacle then filled with meat. The mass should be firmly packed and tamped into the receptacle, and covered with a layer of the curing medium whereupon a sheet of parchment paper or similar material and a thickness of cheese cloth are placed thereon, and the whole covered with a layer of common salt.

The meat is then permitted to cure, according to the nature thereof, for a period ranging from three to seven days at a temperature of about 40° Fahr.

If the meat is not intended to be used immediately upon the expiration of the curing period above specified, it may be permitted to remain without further attention for six months or more if the temperature be reduced to and maintained at about 35 to 36° Fahr.

It is to be noted that by means of my method I am enabled to effect the cure of the meat with a smaller quantity of curing medium and in shorter time than is now possible, and that a milder and more uniform cure is effected in the product, and that the product may thereupon be permitted to remain for long periods of time without attention, and without danger of deterioration or spoilage thereof.

Further, it is to be noted that by the use of my said method the binding qualities of the product are improved.

Having thus described my said invention, what I claim and desire to secure by Letters Patent is:—

1. The method of producing sausage meat and the like which consists in reducing the meat to small pieces and incorporating therewith a dry curing medium including a predetermined amount of nitrite as an added element, substantially as specified.

2. The method of producing sausage meat and the like which consists in reducing the meat to small pieces, adding thereto a dry curing medium including a predetermined amount of nitrite as an added element; mixing the meat with said curing medium, and then reducing the meat to comminuted form and intimately mixing said comminuted meat with said curing medium, substantially as specified.

3. The method of producing sausage meat and the like which consists in separating the meat into small pieces, adding thereto a curing medium including a predetermined amount of nitrite as an added element and thoroughly mixing the same, further reducing the meat to comminuted form and more intimately mixing said comminuted meat with said curing medium, and finally packing the thus-treated meat in a container between layers of the same curing medium, in a dry state, substantially as specified.

4. The method of producing sausage meat and the like which consists in separating the meat into small pieces, adding thereto a curing medium containing nitrite as an added element and thoroughly mixing the same, passing the mass through a grinder in order to reduce the meat to comminuted form and simultaneously more intimately mixing said comminuted meat with said curing medium, packing the thus-treated meat in a container between top and bottom layers of said curing medium in a dry state and permitting the mass to cure at a temperature of about 40° Fahr. for a period of about three to seven days, substantially as specified.

5. The method of producing sausage meat and the like which consists in separating the meat into small pieces, adding thereto a dry curing medium composed of sodium chloride, sodium nitrate, and sodium nitrite, mixing the meat with said curing medium, passing the mass through a grinder to reduce the meat to comminuted form and simultaneously more intimately mixing said comminuted meat with said curing medium, and finally packing the thus-treated meat in a container between top and bottom layers of the same dry curing medium, and permitting the mass to cure, substantially as specified.

6. The method of producing sausage meat and the like which consists in separating the meat into small pieces, adding thereto a dry curing medium composed of about 94.67% sodium chloride, about 4.44% sodium nitrate, and about 0.89% sodium nitrite, mixing the meat with said curing medium, passing the mass through a grinder to reduce the meat to comminuted form and simultaneously more intimately mixing said comminuted meat with said curing medium, and finally packing the thus-treated meat in a container between top and bottom layers of the same dry curing medium, and permitting the mass to cure, substantially as specified.

7. A food product comprising meat reduced to comminuted form, about 100 pounds, having incorporated therewith a dry curing medium composed of sodium chloride 2 pounds, sodium nitrate 1½ ounces, and sodium nitrite $\frac{3}{16}$ ounces, substantially as specified.

Signed at the city of New York, borough of Manhattan, in the county and State of New York, this 10th day of June, one thousand nine hundred and twenty-five.

JULIUS ALSBERG.